US006439848B2

(12) United States Patent
Haehnle et al.

(10) Patent No.: US 6,439,848 B2
(45) Date of Patent: Aug. 27, 2002

(54) DRILLED COOLING AIR OPENINGS IN GAS TURBINE COMPONENTS

(75) Inventors: Hartmut Haehnle, Kuessaberg; Bernhard Weigand, Filderstadt-Sielmingen, both of (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/739,283

(22) Filed: Dec. 19, 2000

(30) Foreign Application Priority Data

Dec. 24, 1999 (DE) ........................................ 199 63 099

(51) Int. Cl.[7] ................................................ F03D 11/02
(52) U.S. Cl. ................................... 416/97 R; 416/96 R
(58) Field of Search ............................ 416/97 R, 97 A, 416/96 R, 96 A; 415/115

(56) References Cited

U.S. PATENT DOCUMENTS

| | | | | |
|---|---|---|---|---|
| 4,992,026 A | * 2/1991 | Ohtomo et al. | ........... | 416/97 R |
| 5,462,405 A | * 10/1995 | Hoff et al. | ................ | 416/97 R |
| 5,733,102 A | * 3/1998 | Lee et al. | ................. | 416/97 R |
| 6,164,914 A | * 12/2000 | Correia et al. | ............ | 416/97 R |
| 6,224,336 B1 | * 5/2001 | Kercher | .................... | 416/97 R |
| 6,254,346 B1 | * 7/2001 | Fkuno et al. | ............. | 416/97 R |

FOREIGN PATENT DOCUMENTS

| | | |
|---|---|---|
| DE | 23 36 952 | 3/1974 |
| DE | 32 48 162 | 7/1983 |
| DE | 44 43 696 | 6/1996 |
| EP | 0 684 364 | 11/1995 |

* cited by examiner

*Primary Examiner*—F. Daniel Lopez
*Assistant Examiner*—J. M. McAleenan
(74) *Attorney, Agent, or Firm*—Burns, Doane, Swecker & Mathis, L.L.P.

(57) ABSTRACT

A blade component of a gas turbine is disclosed around the outside of which hot air flows. The blade component is constructed as a hollow profile having outside walls and a tip cover, and having guiding walls arranged between the outside walls and connecting said outside walls. The blade component is cooled on the inside by cooling air flowing through cooling channels between the outside walls and the guiding walls. Cooling air flows through deflection areas in which the cooling air is deflected into flow stagnation zones. An efficient cooling of the blade component in the area of the stagnation zones is obtained in the area of the flow stagnation zones which are located at the outer corner of the deflection area. At least one drilled opening is provided in the outside wall through which drilled opening cooling air is able to flow at the stagnation zone from the cooling channel onto the outside of the blade component.

13 Claims, 3 Drawing Sheets

DRILLED COOLING AIR OPENINGS IN GAS TURBINE COMPONENTS

FIELD OF THE INVENTION

This invention relates to the field of gas turbines and more specifically to components in gas turbines that are exposed to hot gases.

BACKGROUND OF THE INVENTION

The degree of efficiency of gas turbines depends to a special degree on an efficient use of cooling air. Both operational safety and the assurance of a justifiable life span of the components heated during operation make adequate cooling indispensable. Accordingly, there has always been a concentration on optimizing the cooling of gas turbines.

Components that are surrounded by a flow of hot gases during the operation of the gas turbine, and thus must be cooled appropriately, can be cooled in several ways. On the one hand, it is possible to provide a so-called film cooling, in which cooling air is in a targeted manner passed around the outside surface of the component. On the other hand, a so-called internal cooling can be achieved, whereby the component has cooling channels inside, through which a flow takes place. The internal cooling presupposes that the components are hollow profiles or are at least provided with channels, and that the latter permit good heat transfer from the outside material parts to the cooling air. These two cooling methods are frequently used in combination, since, on the one hand, the internal cooling is only possible in areas where the thickness of the material of the component permits construction as a hollow profile or the attachment of drilled channel openings, and since, on the other hand, an effective film cooling requires good distribution of the cooling air on the outside surfaces. Effective film cooling is only possible in the case of larger surfaces, a strong flow, and, if possible, a low cooling air volume, if the cooling air is supplied at least in part via internal cooling channels.

When constructing such components as hollow profiles, a problem that occurs frequently is that the channels have areas in which the cooling air is deflected, resulting in so-called flow stagnation areas in which the flow becomes distinctly three-dimensional, and in which the cooling then becomes less efficient (so-called "dead water areas"). Such flow stagnation areas in most cases result necessarily from the geometric parameters of the components and channels on the one hand, and, on the other hand, from the fact that a design of the cooling channels that would guide the flow in an optimal way, especially in the deflection areas, would require rounded areas in the corners. But such massive rounded areas, i.e. constructed by filling them with material, would however cause the corners to become heavier, which means that moving components, such as turbine blades, would become less economical and deflection areas and bends in such corners would be cooled even less well. The formation of such flow stagnation areas is often counteracted by integrating ribs or guide plates that specifically supply and remove the cooling air to/from such areas, but such means are often not sufficient to make cooling in the deflection areas efficient enough.

SUMMARY OF THE INVENTION

The invention therefore is based on the objective of providing a component for gas turbines that has internal cooling, in which during operation of the gas turbine, i.e. while hot air flows around the component, and while cooling air simultaneously flows through the component, efficient cooling is made possible in the deflection areas of the cooling air.

This objective is achieved by an arrangement of drilled openings in the flow stagnation zones on the outflow sides of the deflection areas so that these zones are no longer actual dead water areas. The drilled openings provided there cause a flow through the zones and thus have the result that the cooling air is not retained too long in these zones. The cooling efficiency in these areas improves according to the reduced staying time of the cooling air in the flow stagnation zones. The cooling air flowing out of the drilled opening or openings onto the outside, then can simultaneously still be utilized for film cooling on the outside of the component if the drilled opening has been located at a suitable place. The drilled opening or openings can preferably be located on the pressure side in the outside wall facing the flowing air. The exiting cooling air in this way flows around the outside surface to the suction side of the component and acts not only as a ventilation of the flow stagnation zones but also as a film cooling along the path around the component on the suction side.

A preferred embodiment of the invention includes a turbine blade around which a hot working air stream flows. The guide walls in the turbine blade are arranged essentially radially of the rotation axis of the turbine rotor and essentially vertically to the plane of the turbine blade outside surface between the outside walls. The radially extending cooling channels formed in this way are connected in pairs at the tip of the turbine blade in a flow connection; and that in this connection a deflection area of the cooling channels is arranged in the area of the tip. Especially in components designed in this way, the problem of cooling is manifested particularly in the deflection areas. The tips of the turbine blades are exposed to a high mechanical and thermal load during operation, and without sufficient cooling a severe fatigue and wear of the materials in the tip area can hardly be prevented. On the other hand, the geometry of the tips is more or less determined by the function of the blades, and the design of the channels therefore must adapt to it. Especially in the deflection area of the cooling channels that are supplied with cooling air from the hub area, and through which the cooling air flows in a U-shape, significant stagnation zones form; but their cooling efficiency-reducing effect can be prevented or at least greatly reduced by drilled openings.

The arrangement of the drilled openings in the flow stagnation zone on the outflow side is found to be particularly advantageous in combination with, for example, drilled openings arranged on the inflow side and extending essentially radially to the rotation axis of the turbine motor through a tip cover that closes off the hollow profile of the component radially.

These radial drilled openings can also be arranged in an approximate L-shape, i.e. both next to each other, parallel to the tip cover, as well as next to each other, radially along the rear guide wall, around the corner on the outflow side. A group of drilled openings arranged in a two-dimensional, for example triangular, shape that covers an area of the stagnation zone and, for example, in a way connects the two legs of the L's with each other, can also be advantageous.

BRIEF DESCRIPTION OF THE DRAWINGS

A preferred embodiment of the invention is illustrated in the drawing, in which.

DETAILED DESCRIPTION OF THE INVENTION

Figure 1:
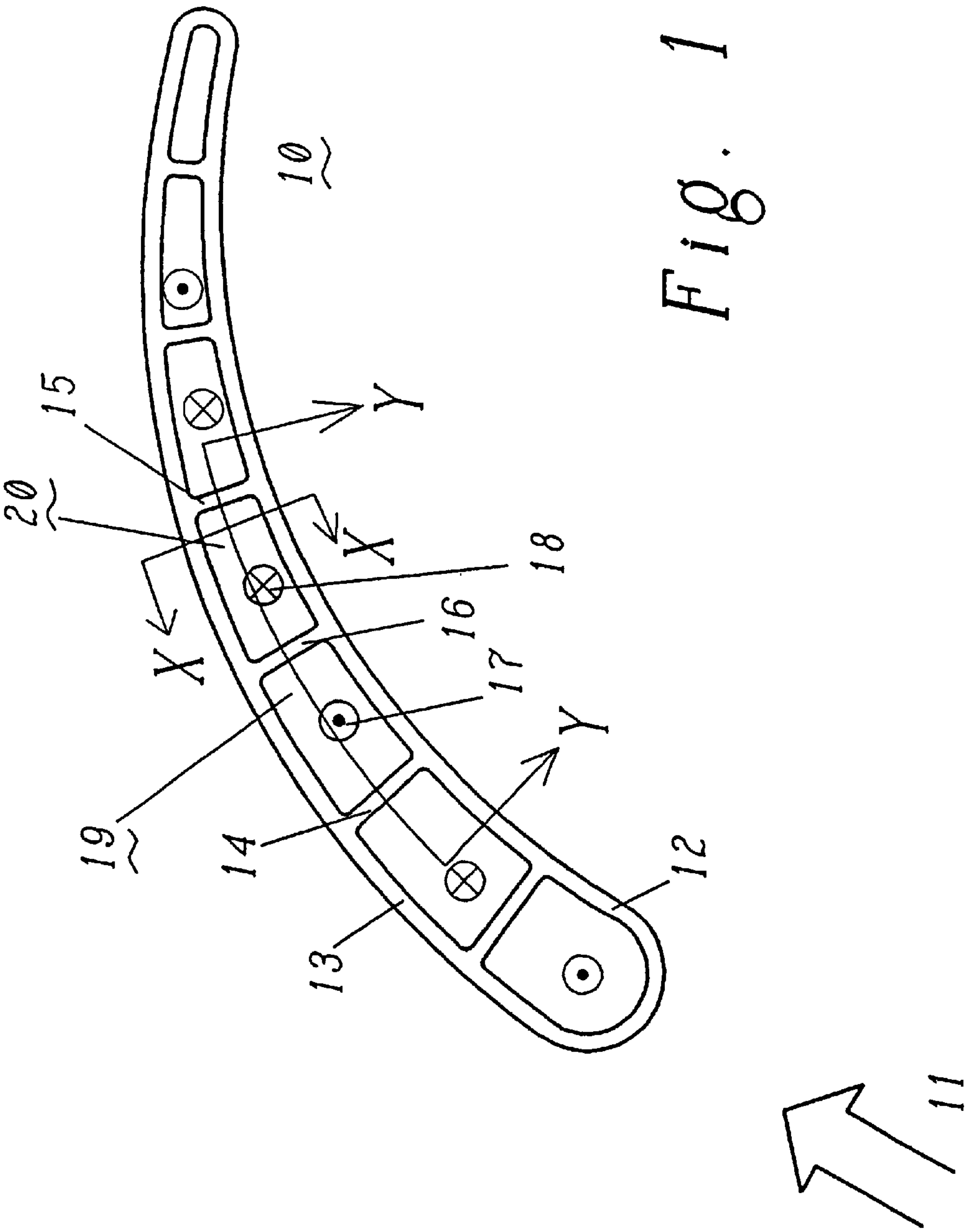
FIG. 1 is a cross-sectional view of a turbine blade essentially tangential in relation to the rotor axis.

FIG. 1 shows a section, essentially tangential in relation to the rotor axis of the turbine rotor, through a turbine blade 10 constructed as a hollow profile. A hot working air stream 11 blows against the rotor blade 10 on the pressure side, setting this rotor blade into motion. The outside shape of the blade 10 is formed by the outside wall 12 on the pressure side, the outside wall 13 facing away from the air flow on the suction side, and a tip cover 21 (FIGS. 2 and 3) that forms the radially outside border of the blade 10. The walls 12, 13, and 21 are connected via guide walls 14, 15, and 16 that extend radially in relation to the rotor axis and vertically in relation to the rotor blade plane with each other. These guide walls not only stabilize the blade but also simultaneously act as guide walls for the cooling air 17, 18 flowing through the hollow profile. Normally, the cooling air 17 is blown from the hub side into a cooling channel 19 with ascending ventilation and is guided to the tip. Each tip is provided with a break-through to an adjoining cooling channel 20, through which the cooling air 18 is again passed after a 180° deflection in zone 22 radially in the direction towards the hub. In this way, pairs of channels 19 and 20 are connected with each other in accordance with the flow, and the cooling air is able to either consecutively flow through the pairs inside blade 10 in the manner of a meander or can be supplied individually.

The cooling channels can be provided with ribs 23 or baffles, which, for the purpose of better heat transfer between the housing—i.e. the walls 12–16 and 21—and the cooling air, either force the latter, for example in a meander shape, so that it will impact the walls, or enable an optimum flow even in deflection areas. The blade 10 also can be provided additionally with independent means or means following the internal cooling for a film cooling of the outside (not shown in FIG. 1).

When the cooling air 17 is deflected at the tip of the blade, this will in most cases result in flow stagnation zones at the corners of the deflection area. One of these occurs mostly on the side of the incoming flow 29, i.e. at the corner at the inlet into the deflection area 22, and another one on the outflow side 30, at the corner at the outlet of deflection area. The cooling medium remains longer in zones 29 and 30 than in other areas, and a less efficient heat exchange takes place. Guide ribs 23 that guide the cooling medium in a specific manner also are not able to really prevent such dead water areas, and the guide walls 14 and 15, outside walls 12 and 13, as well as the tip cover 21 are heated more in these zones than at other places.

In order to better ventilate the zone 30 on the inflow side, a drilled opening 25, for example, can be provided in the tip cover 21, and radially ventilate the cooling channel there. It is useful that this drilled opening 25 merges into an outside recess in the tip cover 21.

In order to better ventilate the zone 30 on the outflow side (or, if applicable, analogously on the inflow side), drilled openings 24 are now provided in the outside wall 12 on the pressure side. These drilled openings 24 result in a flow of cooling air through the bores onto the outside. On the outside, the cooling air 27 then flows around the tip of the blade onto the suction side of the rotor and hereby cools the tip in the manner of a film cooling. The tip of the rotor blade hereby can be constructed either in a simple manner or may be provided with, for example, rib extensions 26 at the tip for a seal between the rotor and the housing. Especially in the latter case, the additional film cooling effect may turn out to be particularly advantageous. Naturally, the drilled openings 24 also can be provided on the suction side of the blade 10, but the advantageous film cooling effect is hereby essentially eliminated.

Figure 2:
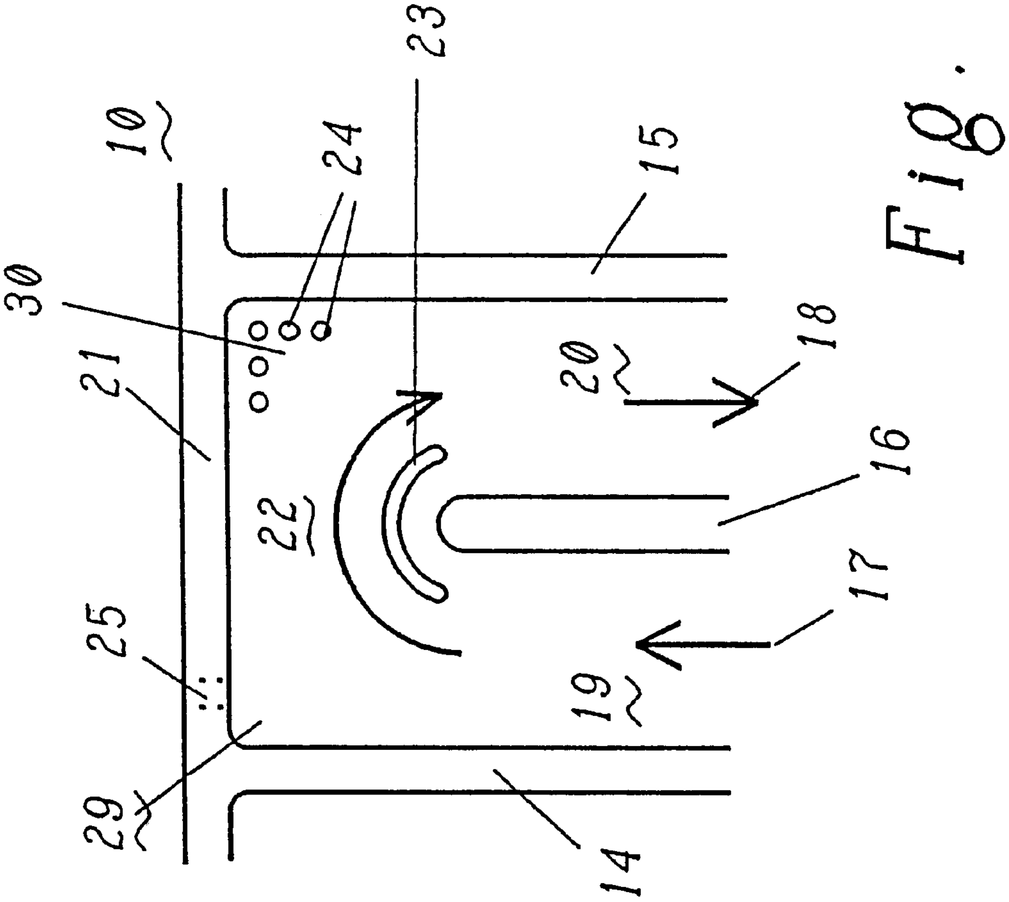
FIG. 2 is a cross-sectional view of the turbine blade along the line Y—Y in FIG. 1.
Figure 3:
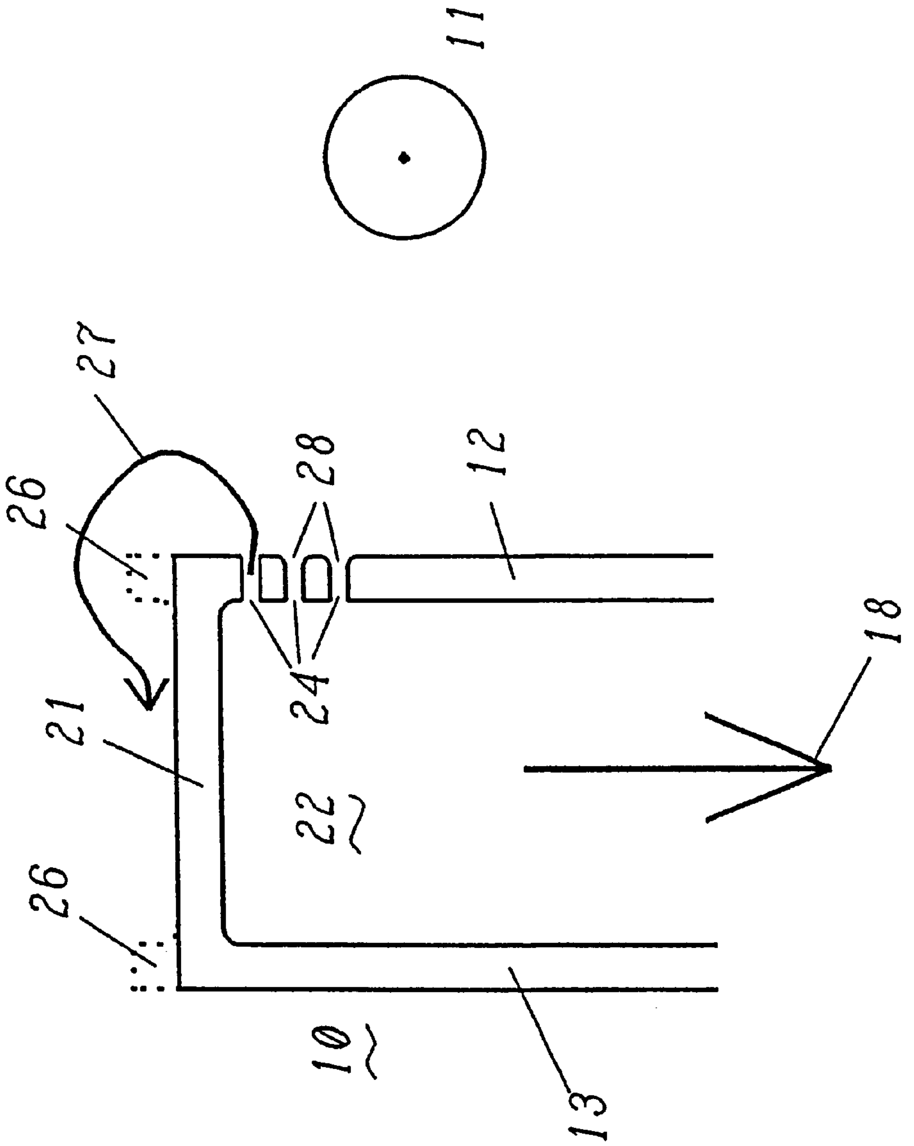
FIG. 3 is a cross-sectional view of the turbine blade along the line X—X in FIG. 1.

The drilled openings 24 can be arranged parallel to the direction of the tip cover 21, next to each other in a row or offset from each other, and/or analogously parallel to the rear guide wall 15. It was found that in particular the row of drilled openings parallel to the guide wall 15, i.e. essentially radial to the axis of the rotor, was effective for ventilating the flow stagnation zones. The drilled openings 24, as shown in FIG. 2), can be arranged in an L-shaped row or two-dimensionally, i.e. in several rows arranged next to each other so as to ventilate an entire area. The area may hereby have a triangular shape, i.e. connect the legs of the above L-shaped arrangement, or may cover another area on the outside wall relative to the flow stagnation zone.

These drilled openings can be constructed cylindrically or so as to be flared towards the outside, the latter in particular for those extending radially and not located directly at the tip cover (see extension 28), i.e. in a sort of tube shape, in order to ensure improved flow behavior. The drilled openings may extend vertically to the plane of the blade 10, but can also be drilled at an angle, slightly radial towards the outside. The drilled holes may have different or identical diameters. To prevent obstructions, at least one large drilled opening may also be provided. The drilled openings should be spaced apart from each other by at least one opening diameter, and a first row of drilled openings 24 should be arranged not more than five opening diameters from the tip cover 21 in respect to the rear guide wall 15.

What is claimed is:

1. A rotor blade for a gas turbine comprising: a hollow blade having outside walls and a tip cover, and having first and second internal guide walls arranged between the outside walls, said first guide wall being located closer to a leading edge of said blade than said second guide wall and said second guide wall being located closer to a trailing edge of said blade than said first guide wall, said first and second guide walls each intersecting said tip cover, a central guide wall between the first and second guide walls, said central guide wall being spaced from said tip cover, thereby forming a cooling air passage extending in sequence between the first guide wall and the central guide wall and extending between the central guide wall and the tip cover and extending between the central guide wall and the second guide wall, the cooling air passage having flow stagnation zones adjacent the intersection between the tip cover and the respective first and second guide walls, and a plurality of openings drilled in an outside wall on the pressure side of the blade, said openings arranged in proximity to at least one of said flow stagnation zones and arranged at least next to the second guide wall in at least two rows, whereby cooling air is able to flow from the cooling air passage to the outside of the blade to obtain a more efficient cooling effect.

2. The rotor blade as claimed in claim 1, further including openings drilled in the tip cover and extending in a substantially radial direction relative to the rotation axis of the turbine rotor.

3. The rotor blade as claimed in claim 2 wherein the tip cover has a tip extension on the outside of the tip cover adjacent said openings in the tip cover.

4. The rotor blade as claimed in claim 1 wherein a guide rib is mounted in the hollow blade between the central guide wall and the tip cover.

5. The rotor blade according to claim 1, wherein:

at least one row of said openings is parallel to said guide wall.

6. The rotor blade accoding to claim 1, wherein:

the openings in the outside wall are arranged next to the second wall in two rows, with one row parallel to the second guide wall and one row parallel to the tip cover.

7. The rotor blade according to claim 1 wherein:

the openings in the outside wall are arranged next ot the second guide wall in an entire area relative to one of said flow stagnation zones.

8. The rotor blade according to claim 1, wherein:

the openings in the outside wall are arranged next to the second guide wall in an entire area having a triangular shape relative to one of said flow stagnation zones.

9. The rotor blade according to claim 1, wherein the openings have the same diameter.

10. The rotor blade according to claim 1, wherein the openings have different diameters.

11. A rotor blade for a gas turbine comprising: a hollow blade having outside walls and a tip cover, and having first and second internal guide walls arranged between the outside walls, said first and second guide walls being spaced apart from each other and each intersecting said tip cover, a central guide wall between the first and second guide walls, said central guide wall being spaced from said tip cover, thereby forming a cooling air passage extending in sequence between the first guide wall and the central guide wall and extending between the central guide wall and the tip cover and extending between the central guide wall and the second guide wall, the cooling air passage having flow stagnation zones adjacent the intersection between the tip coever and the respective first and second guide walls, and a plurality of openings drilled in an outside wall on the suction side of the blade in proximity to at least one of said flow stagnation zones, whereby cooling air is able to flow from the cooling air passage to the outside of the blade to obtain a more efficient cooling effect.

12. A rotor blade for a gas turbine comprising: a hollow blade having outside walls and a tip cover, and having first and second internal guide walls arranged between the outside walls, said first and second guide walls being spaced apart from each other and each intersecting said tip cover, a central guide wall between the first and second guide walls, said central guide wall being spaced from said tip cover, thereby forming a cooling air passage extending in sequence between the first guide wall and the central guide wall and extending between the central guide wall and the tip cover and extending between the central guide wall and second guide wall, the cooling air passage having flow stagnation zones adjacent the intersection between the tip cover and the respective first and second guide walls, and a plurality of openings in an outside wall arranged in proximity to at least one of said flow stagnation zones, the openings are cylindrical and extend perpendicular to the outside wall, the openings being spaced apart from each other by at least one diameter of the openings, and being arranged in rows, the openings being spaces at least 5 diameters of the openings from the tip cover and the openings being located adjacent the second guide wall, whereby cooling air is able to flow from the cooling air passage to the outside of the blade to obtain a more efficient cooling effect.

13. The rotor blade as claimed in claim 12 wherein the openings include a conical portion adjacent the outside of one of the outside walls.

* * * * *